(12) United States Patent
Danilov et al.

(10) Patent No.: US 11,112,978 B2
(45) Date of Patent: Sep. 7, 2021

(54) ROUTING TO OBTAIN USER DATA IN A GEOGRAPHICALLY DISTRIBUTED DATA STORAGE ENVIRONMENT

(71) Applicant: EMC IP Holding Company LLC, Hopkinton, MA (US)

(72) Inventors: Mikhail Danilov, Saint Petersburg (RU); Yohannes Altaye, Dumfries, VA (US)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 9 days.

(21) Appl. No.: 16/781,316

(22) Filed: Feb. 4, 2020

(65) Prior Publication Data

US 2021/0240360 A1 Aug. 5, 2021

(51) Int. Cl.
| | |
|---|---|
| *G06F 12/00* | (2006.01) |
| *G06F 3/06* | (2006.01) |
| *G06F 9/30* | (2018.01) |
| *G06F 13/00* | (2006.01) |
| *G06F 13/28* | (2006.01) |

(52) U.S. Cl.
CPC ............ *G06F 3/0619* (2013.01); *G06F 3/064* (2013.01); *G06F 3/067* (2013.01); *G06F 3/0617* (2013.01); *G06F 3/0653* (2013.01); *G06F 3/0659* (2013.01); *G06F 9/30029* (2013.01)

(58) Field of Classification Search
CPC .... G06F 3/0619; G06F 3/0617; G06F 9/0653; G06F 9/30029; G06F 3/064; G06F 3/067; G06F 3/0659
See application file for complete search history.

(56) References Cited

U.S. PATENT DOCUMENTS

| | | | |
|---|---|---|---|
| 9,128,910 B1* | 9/2015 | Dayal | G06F 3/0659 |
| 9,442,802 B2* | 9/2016 | Hung | G06F 11/1076 |
| 2003/0016596 A1* | 1/2003 | Chiquoine | G06F 11/1088 369/34.01 |
| 2014/0172930 A1* | 6/2014 | Molaro | G06F 16/1844 707/827 |
| 2014/0304460 A1* | 10/2014 | Carlson, Jr. | G06F 15/17318 711/103 |
| 2014/0351633 A1* | 11/2014 | Grube | G06F 3/0619 714/6.24 |
| 2017/0123914 A1* | 5/2017 | Li | G06F 3/064 |
| 2019/0102103 A1* | 4/2019 | Ari | G06F 3/0619 |
| 2020/0034339 A1* | 1/2020 | Gershaneck | G06F 16/162 |

* cited by examiner

*Primary Examiner* — Mark A Giardino, Jr.
(74) *Attorney, Agent, or Firm* — Amin, Turocy & Watson, LLP

(57) ABSTRACT

The described technology is generally directed towards obtaining data, such as corresponding to a read request, from a geographic zone which may not be the zone that owns the data. When a request for data (e.g., a data segment) is received by a zone that does not own the requested data, the zone evaluates statistical data to determine whether it is more efficient to obtain the requested data directly from the zone that owns the data, or indirectly from one or more zones that contain related data from which the requested data can be reconstructed. If the indirect route is deemed sufficiently more efficient, the reconstruction data (e.g., counterpart segments) are obtained, and processed into the requested data, e.g., by XOR-ing the counterpart data segments into the requested data segment for returning to the client.

20 Claims, 11 Drawing Sheets

ROUTING TO OBTAIN USER DATA IN A GEOGRAPHICALLY DISTRIBUTED DATA STORAGE ENVIRONMENT

TECHNICAL FIELD

The subject application relates generally to data storage, and, for example, to a technology that facilitates efficiently returning data in a geographically distributed environment, and related embodiments.

BACKGROUND

Contemporary data storage systems, such as Dell EMC®'s ECS (formerly Elastic Cloud Storage) service, store data in a way that ensures data protection while retaining storage efficiency. For additional protection of user data and metadata, ECS supports geographically distributed setups of multiple zones (geographically distributed node clusters), with the data and metadata of one zone distributed and replicated to two or more zones by asynchronous replication.

When there are three or more geographic zones, an eXclusive OR (XOR) technique can be used to minimize capacity overhead associated with such additional data protection. Instead of storing multiple blocks (such as a chunk) of identically replicated data per zone, one zone can store one block of data, another zone can store a different block of data, and yet another zone can store a third block of data that is a bitwise XOR of the two different blocks. For example, consider that some block A of data is owned by Zone 1; Zone 1 can store block A, Zone 2 can store a (different) block B, and zone X can store block X, which is block A XOR-ed with block B. Then if block A is ever lost or corrupt, block A can be restored via an XOR of block X and block B; similarly if bock B is ever lost or corrupt, block B can be restored via an XOR of block X and block A.

After a data chunk has been XOR-ed in this way, only one copy of the user data remains, which resides in the data chunk stored in the chunk's primary (owning) zone. If for some reason communications between this zone and one or more other zones become slow, such as due to network issues, the resulting delays can severely impact the data storage service's performance characteristics. In some scenarios, approximately 1/N of data reads are relatively very slow, where N is the number of zones in the geographically distributed setup. This can lead to a considerable failure rate for read operations caused by expiration of system internal timeouts.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
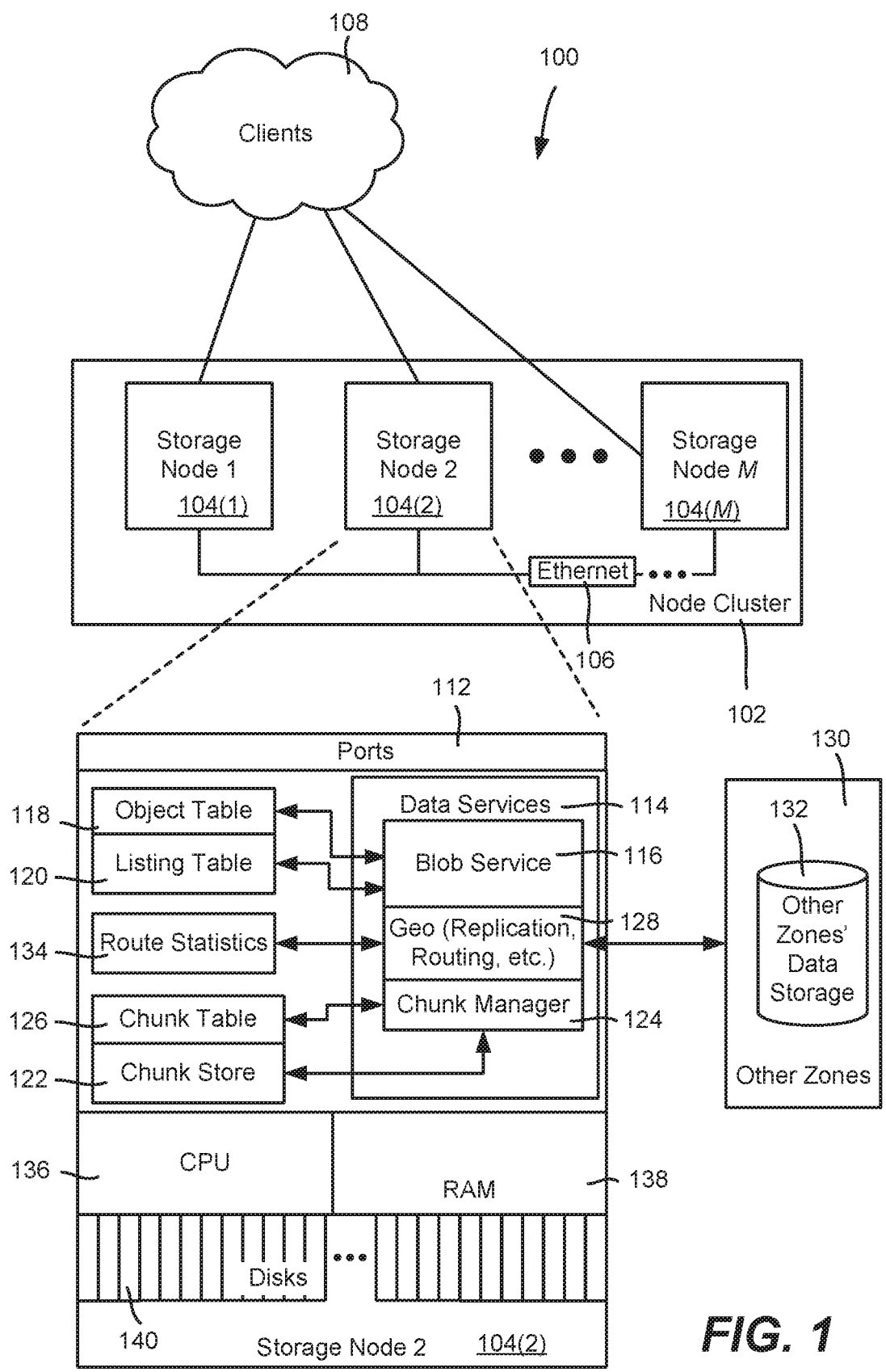
FIG. 1 is an example block diagram representation of part of a data storage system including nodes and geographic zones, in which geographic recovery of data can be performed, in accordance with various aspects and implementations of the subject disclosure

Various aspects of the technology described herein are generally directed towards returning data more efficiently (e.g., faster) to a requesting client in a data storage system with geographically distributed zones that protect actual data by maintaining other data by which the actual data can be reconstructed. In one aspect, when a local zone receives a client request for data that is owned by another, remote owning zone, instead of directly requesting the data from the remote owning zone, the local zone evaluates whether there is a (likely) more efficient route to obtaining the data, including that the data needs to be reconstructed. The local zone selects the likely more efficient route to obtain the requested data, and when the requested data is obtained, returns the requested data to the requesting client. As a result, overly slow data read operations, and often corresponding timeout failures, can be avoided.

By way of example, consider that there are communication issues with a first remote zone that owns client-requested data, e.g., in a data chunk. As is understood, such data (e.g., some or all of the data chunk) can be reconstructed via data maintained at other zones. Thus, it may be more efficient to obtain reconstruction data via a route to another zone (or zones), reconstruct the data, and return the client-requested data to the client. Statistics or the like can be used as a basis for selecting the direct route or the indirect (reconstruction-based) route.

In one or more implementations, requested data obtained from a remote zone is not a direct replica of the requested data, but instead is reconstruction data (also useable for recovery), which when combined (e.g., XOR-ed) with counterpart reconstruction data, provides the actual requested data. The counterpart reconstruction data can be local data, or maintained at and obtained from yet another remote zone.

It should be understood that any of the examples herein are non-limiting. For instance, some of the examples are based on ECS data storage technology; however virtually any storage system may benefit from the technology described herein. As a more particular example, the term "chunk" can be used as an example of a unit of data storage, however any data block can be used in other storage systems. Similarly, a "segment" identified by an "offset" and "size" is used to indicate part of a data chunk/block, although it is understood that other terms that can identify such a sub-unit of storage can be used. Still further, the technology described herein is not limited to geographic zones, but can be used with any requests for data received at a server or the like that can be handled by rerouting requests and processing related data to obtain the requested data. Thus, any of the embodiments, aspects, concepts, structures, functionalities or examples described herein are non-limiting, and the technology may be used in various ways that provide benefits and advantages in computing and data storage in general.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

In ECS, disk space is partitioned into a set of blocks of fixed size called chunks, which in one or more implementations are 128 megabytes in size. The various types of data, including user data and various types of metadata, are stored in chunks. There are different types of chunks, one type per capacity user. In particular, user data is stored in repository chunks, and chunks can be shared. For instance, one chunk may (and in typical cases does) contain segments of multiple user objects.

As set forth herein, geographic zones can be used to replicate data, including user chunks, for additional data protection. The various user data chunks are distributed among the zones, with one zone (a node in the zone cluster) responsible for owning a given chunk. Because replication takes time (and because in environments having three or more zones the data is not directly available at another zone), a client request to one zone for data that is in a chunk owned by another zone is obtained by having the other zone request and receive the data from the owning zone, and then once received, return the data to the requesting client.

However, as described herein, when the requested data is not available from the zone that owns the chunk in an efficient manner, the requested data can be reconstructed using data from one or more other zones. As set forth herein, reconstruction of a complete chunk (e.g., 128 MB) can take time, so only a requested segment can be reconstructed separately. For data storage environments having three or more zones, XOR can be used; for Zone 1 (which owns Chunk A) and Zone 2 (which owns Chunk B), both zones can replicate their respective chunks A and B to Zone 3. Zone 3 does not store chunk copies for Chunk A and Chunk B but instead only one Chunk X is stored by Zone 3, comprising the result of XOR (eXclusive OR) for Chunk A content and Chunk B content, that is, Chunk X=XOR(Chunk A, Chunk B).

When a chunk with user data, e.g., Chunk A or Chunk B, is not readily (efficiently) available, the corresponding XOR chunk can be used to reconstruct the data content via GEO recovery. GEO recovery can be represented as:

$$\text{Chunk } A = XOR(\text{Chunk } X, \text{Chunk } B), \text{ and}$$

$$\text{Chunk } B = XOR(\text{Chunk } X, \text{Chunk } A).$$

In such a setup, Chunk A contains an object segment, with the segment's content represented as Chunk A(offset, size). Then, if Chunk A cannot be efficiently accessed, such as due to slow communication conditions, the object segment can be reconstructed using (relatively small) parts of Chunk X and Chunk B, by:

$$\text{Chunk } A(\text{offset}, \text{size}) = XOR(\text{Chunk } X(\text{offset}, \text{size}), \text{Chunk } B(\text{offset}, \text{size})).$$

Given the above examples, consider that a client requests an object from Zone 2 in which the objects corresponds to the Chunk A(offset, size) segment owned by Zone 1. Zone 2, which contains information that indicates that Zone 1 owns chunk A, recognizes (e.g., via statistics) that communication with Zone 1 is sufficiently slow so as to not request the data segment (abbreviated to A(o,s)) from Zone 1. Instead, Zone 2 requests reconstruction data from Zone 3 to recover A(o,s) by providing X(o,s) from Zone 3's XOR-ed Chunk X. Zone 2 recognizes that B(o,s) is needed to do this, and thus obtains B(o,s) from its own local storage (Zone 2) if locally owned, or from another zone that owns chunk B. Zone 2 can then bitwise XOR X(o,s) and B(o,s) to reconstruct A(o,s) for returning to the client.

FIG. 1 shows part of a data storage system 100 (such as ECS) comprising a node cluster 102 of storage nodes 104(1)-104(M), in which each node is typically a server configured primarily to serve objects in response to client requests. The nodes 104(1)-104(M) are coupled to each other via a suitable data communications link comprising other interfaces and protocols, such as represented in FIG. 1 by Ethernet block 106.

Clients 108 make data system-related requests to the cluster 102, which in general is configured as one large object namespace; there may be on the order of billions of objects maintained in a cluster, for example. To this end, a node such as the node 104(2) (shown enlarged in FIG. 1 as well) generally comprises ports 112 by which clients connect to the cloud storage system. Example ports are provided for requests via various protocols, including but not limited to SMB (server message block), FTP (file transfer protocol), HTTP/HTTPS (hypertext transfer protocol) and NFS (Network File System); further, SSH (secure shell) allows administration-related requests, for example.

Each node, such as the node 104(2), includes an instance of a data storage system and data services 114; (note however that at least some data service components can be per-cluster, rather than per-node, and possibly per-sub-group of nodes). For example, ECS runs a set of storage services, which together implement storage logic. Services can maintain directory tables for keeping their metadata, which can be implemented as search trees. A blob service 116 maintains an object table 118 (e.g., in various partitions among nodes, including geographically separated zones) that keeps track of objects in the data storage system and generally stores their metadata, including an object's data location information, e.g., within a chunk. The blob service 116 also maintains a listing table 120, although it is alternatively feasible to have such a listing table maintained by another service.

FIG. 1 further represents some additional concepts, in that the user data repository of chunks is maintained in a chunk store 122, managed by another storage service referred to as a chunk manager 124. A chunk table 126 maintains metadata about chunks, e.g., as managed by the chunk manager 124. Note that directory tables and other data can also be maintained in data chunks.

In one or more implementations, the data services 114 can also include geographic-related services (block 128), such as replication and (as described herein) geo-routing/reconstruction related communications to and from remote zones 130 and their data storage 132. As is understood, data communications between a local zone and a remote zone can be relatively inefficient, however at times, such as based on route statistics 134, data communications can be more efficient via the technology described herein.

In FIG. 1, a CPU 136 and RAM 138 are shown for completeness; note that the RAM 138 may comprise at least some non-volatile RAM. The node 104(2) further includes storage devices such as disks 140, comprising hard disk drives and/or solid-state drives, or any other suitable type of storage resource. As can be readily appreciated, components of the data storage system including those described herein can be at various times in any storage device or devices, such as in the RAM 138, in the disks 140, or in a combination of both, for example.

Figure 2:
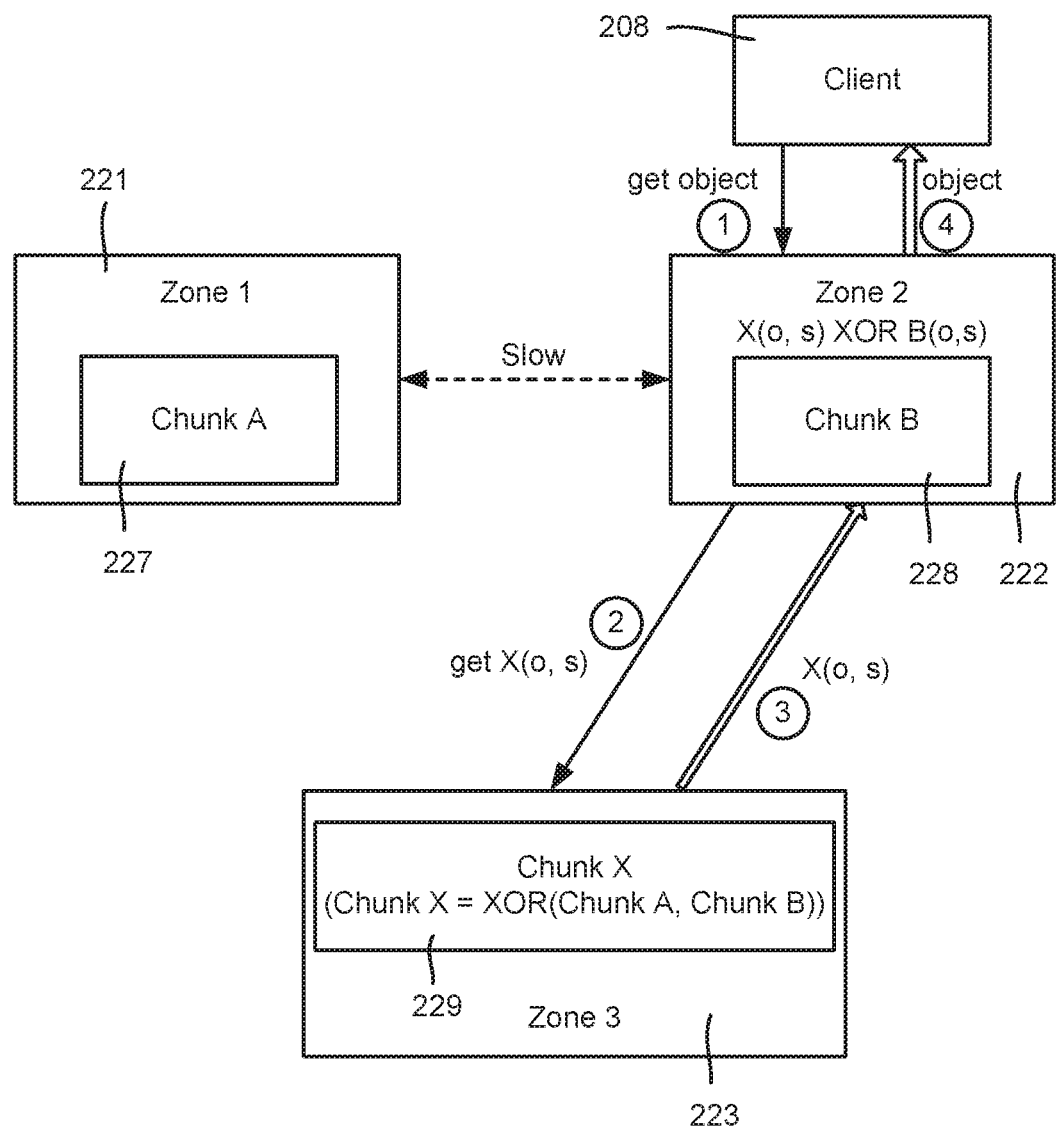
FIGS. 2-4 are example block diagram/data flow diagram representations related to routing to indirectly obtain data by a non-owning zone in a distributed zone environment in various scenarios, in accordance with various aspects and implementations of the subject disclosure.

As represented in FIG. 2, in an example implementation similar to the above example(s), a read request for an object's data is received from a client 208 (the arrow labeled one (1)) at a Zone 2 222. As before, in this example Zone 1 221 owns the requested data in Chunk A 227, while Zone 2 222 owns Chunk B 228, and Zone 3 223 own chunk X 229 based on the XOR-ing of replicated copies of respective chunk A 227 and chunk B 228 to Zone 3 223.

When the read request is received and processed, Zone 2 222 evaluates statistics before requesting the relevant segment and chunk associated with the requested object. In this example, the statistics indicate that the communications route to zone 1 221 is sufficiently slow to instead re-route the request to Zone 3 223 to obtain the XOR-ed version of the requested data from the chunk 229, as represented by the arrow labeled two. Note that the statistics can include the time to reconstruct (bitwise XOR) the reconstruction data portions, which is generally mostly negligible. Moreover, as described herein, the statistics can be evaluated versus a performance improvement threshold, e.g., the time to obtain the XOR-ed version of the requested data from the Zone 3 may need to be twice as fast as the time to obtain the direct data from the zone 1; such a threshold value can factor in the time to reconstruct.

Zone 3 responds with the counterpart reconstruction segment X(o,s) at arrow three (3). Once Zone 2 222 receives segment X(o,s) from the zone 3 223, the requested segment data is recovered by XOR-ing segment X(o,s) with the counterpart segment B(o,s) accessed in the local chunk B 228. The requested object is thus returned to the client 208 as represented in FIG. 2 by the labeled arrow four (4).

As can be seen, Zone 2 reads X(o,s) from Zone 3, XOR-s this segment with local segment B(o,s), and sends the result, which is A(o,s)/the object data, to the data client. Note that any of the segment-related information can be cached for some appropriate time, so that for example if the Zone 3 receives another request corresponding to segment A(o,s), no similar reconstruction is needed.

Note that in the example of FIG. 2, just one data segment of size s is transferred over the inter-zone network. The same amount of data is transferred to directly read the data from its home chunk/zone (Zone 1).

To summarize, the GEO reconstruction indirect ("bypass") path that is selected by Zone 2 is not as direct as one in which the owning zone provides the requested data, but can be more efficient. In particular, in the example implementation of FIG. 2, it is deemed sufficiently more efficient (e.g., sufficiently faster) to obtain the XOR copy of the data from the Zone 3 223 and perform the XOR operation to reconstruct the requested data than to attempt to obtain the data directly from the Zone 1 221.

Figure 3:
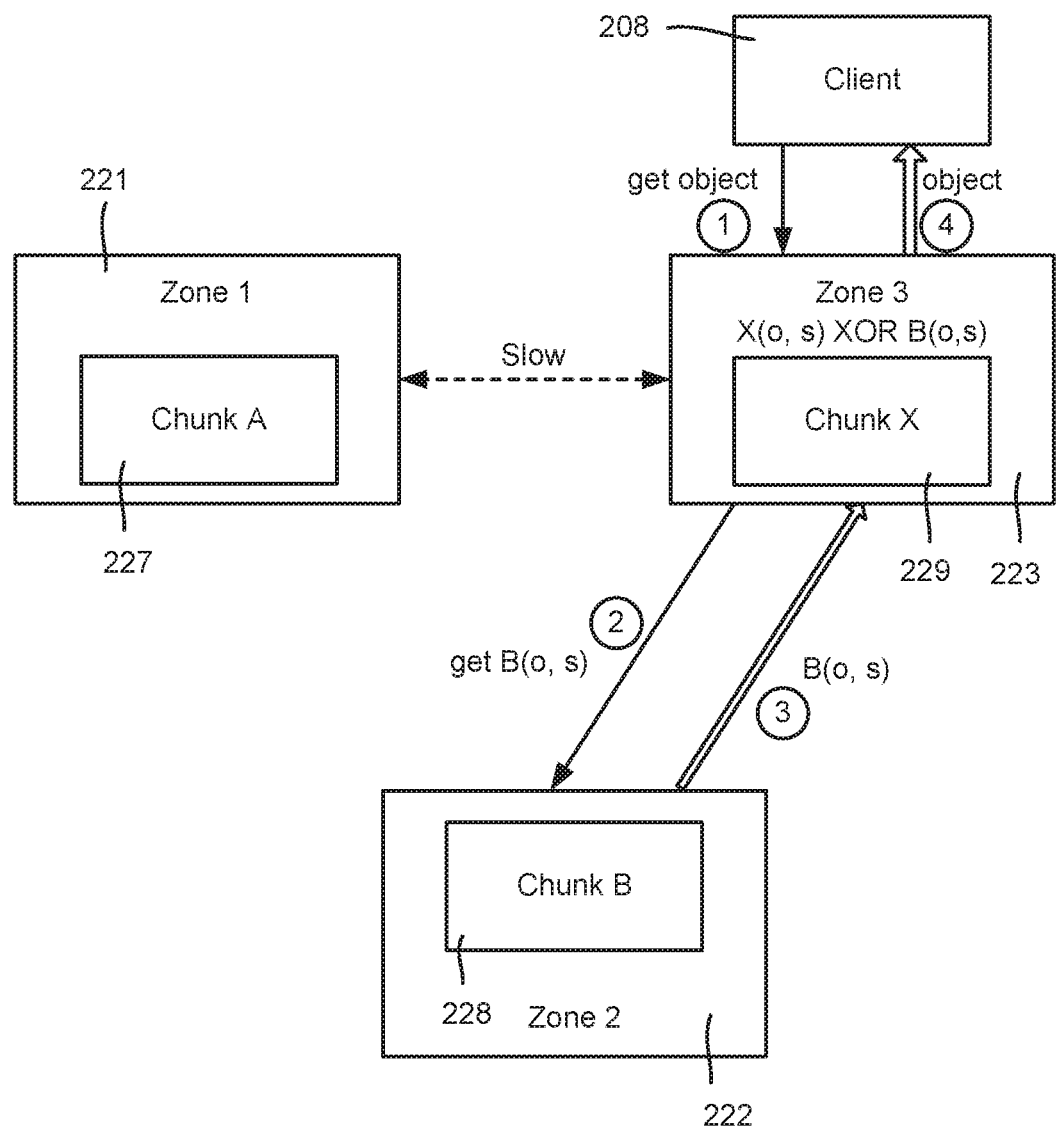

The example shown in FIG. 3 is similar to FIG. 2, except that in FIG. 3, Zone 3 223 receives the client request for the object. Thus, when Zone 3 223 evaluates its particular statistics, Zone 3 obtains segment B(o,s) from Zone 2, performs the XOR with its own segment part from Chunk X 229 to obtain A(o,s) and returns the corresponding object data to the requesting client.

It should be noted that the zones may not have the same statistics for their respective communication routes. For example, there may be a network problem between Zone 1 221 and Zone 2 222 as in FIG. 2, but no such problem between zone 3 223 and zone 1 221. In such a situation, unlike the example in FIG. 3, the statistics maintained at the Zone 3 223 would not choose the indirect reconstruction route, but instead directly obtain the requested data from the Zone 1 227.

Figure 4:
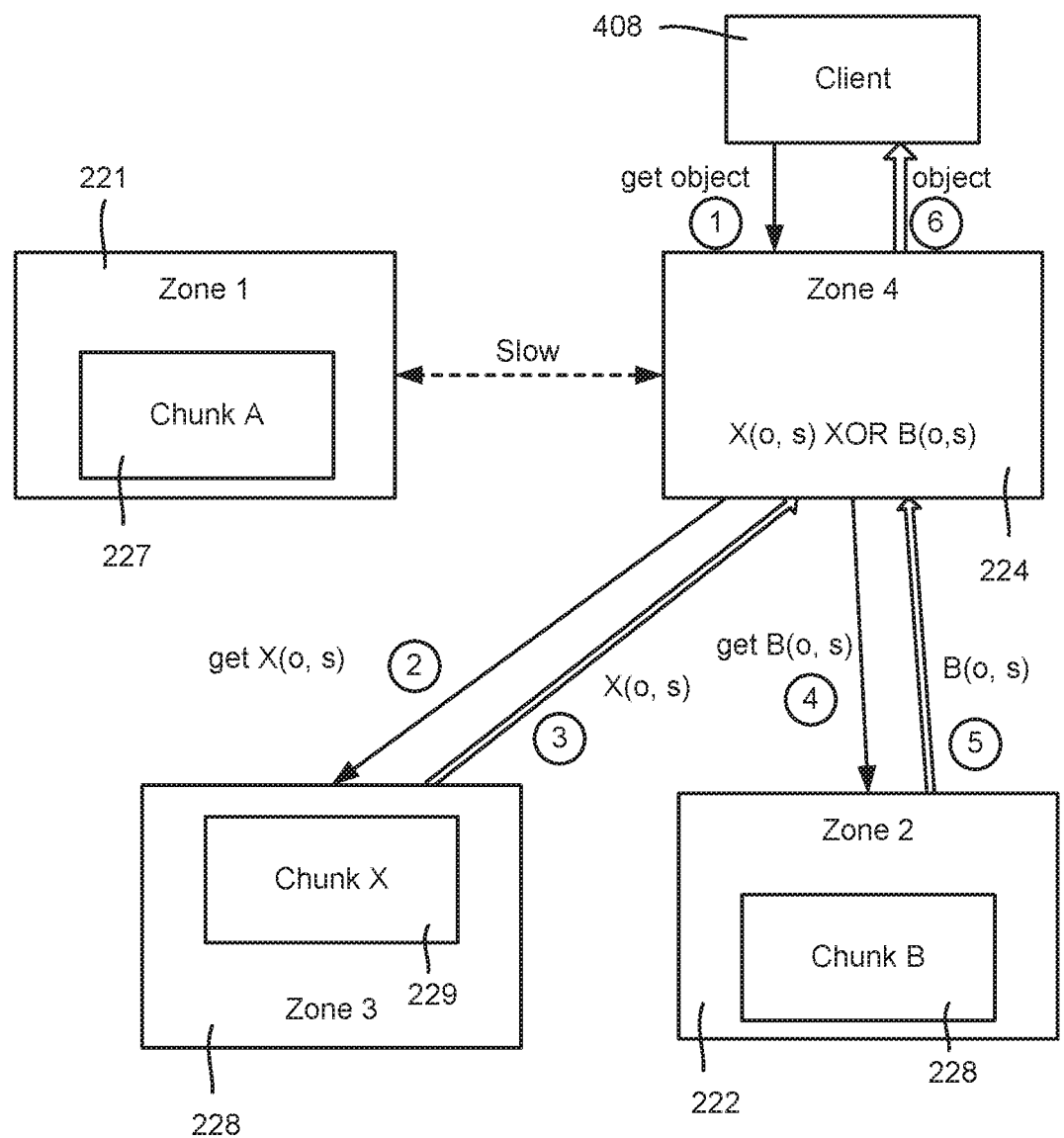

FIG. 4 shows a four zone scenario, in which a zone 4 224 that owns no part of the segment receives the request for the object from a client 408. As can be seen by following the labeled arrows, instead of the slow route to the Zone 1 221, Zone 4 224 obtains the reconstruction data from the Zone 2 222 (the "peer" data reconstruction portion) and the Zone 3 223 (the "XOR" data reconstruction portion). Note that the reconstruction data portions can be obtained substantially in parallel, and thus the statistics that indicate the slower of the two routes (whether to the Zone 3 223 or to the Zone 2 222) can be used in the evaluation versus the time data maintained for the route to the Zone 1. In the example of FIG. 4, the Zone D 224 more efficiently gets the segment parts needed to perform the XOR reconstruction.

In sum, the short route to a portion of user data is straightforward read of user data from its home chunk/zone, while a bypass comprises a read of peer data and XOR portions, plus the reconstruction (bitwise XOR) operation time. To be able to compare the two routes, the system maintains statistics, which, for example may include the time to read a segment of data from a remote zone (that is, per zone statistics) and the time to bitwise XOR segments of data (normally negligibly small).

The statistical time values may be averaged times over a time window (e.g., the last ten minutes), and regularly updated. Because peer data and XOR data portions can be read in parallel, the statistical values for read operations are not summed; rather, the longest estimated duration of a read is taken for a given protection set (peer data reconstruction portion and XOR data reconstruction portion). The sum of that longest duration and the duration of the XOR operation provides the estimated time for the indirect/bypass route.

As can be readily appreciated, the data storage system is expected to use the fastest route to user data. Notwithstanding, comparison of the two routes need not be an identical comparison. The bypass route that obtains the reconstruction data portions using one or more indirect routes may involve considerably more I/O operations and computing resources, whereby the excessive use of such bypasses may increase system workload considerably. Thus, an impediment can be associated with bypasses; that is, a threshold performance improvement can be evaluated to ensure that using the bypass route is worthwhile. For instance, the time to use the direct route can be compared with X times (e.g. double) the time to use the bypass route, such that the bypass route bypass is used only when it gives a significant performance improvement, e.g., approximately double.

It should be noted that communications with a given zone can become so slow that the system blacklists that particular zone by designating (marking) that zone as being in a temporary site outage mode. When this occurs, other zones abandon attempts to read any data from the temporary site outage zone until that zone is again marked as being online. The bypass selection described herein is used to assure efficient availability of data to serve the read request. Thus, when a bypass cannot be routed without use of a blacklisted zone, the attempt to use a bypass can be abandoned. Conversely, if the primary zone that owns requested data is blacklisted by a bypass zone is not, the bypass route can be chosen, including without evaluating statistical time information.

Figure 5:
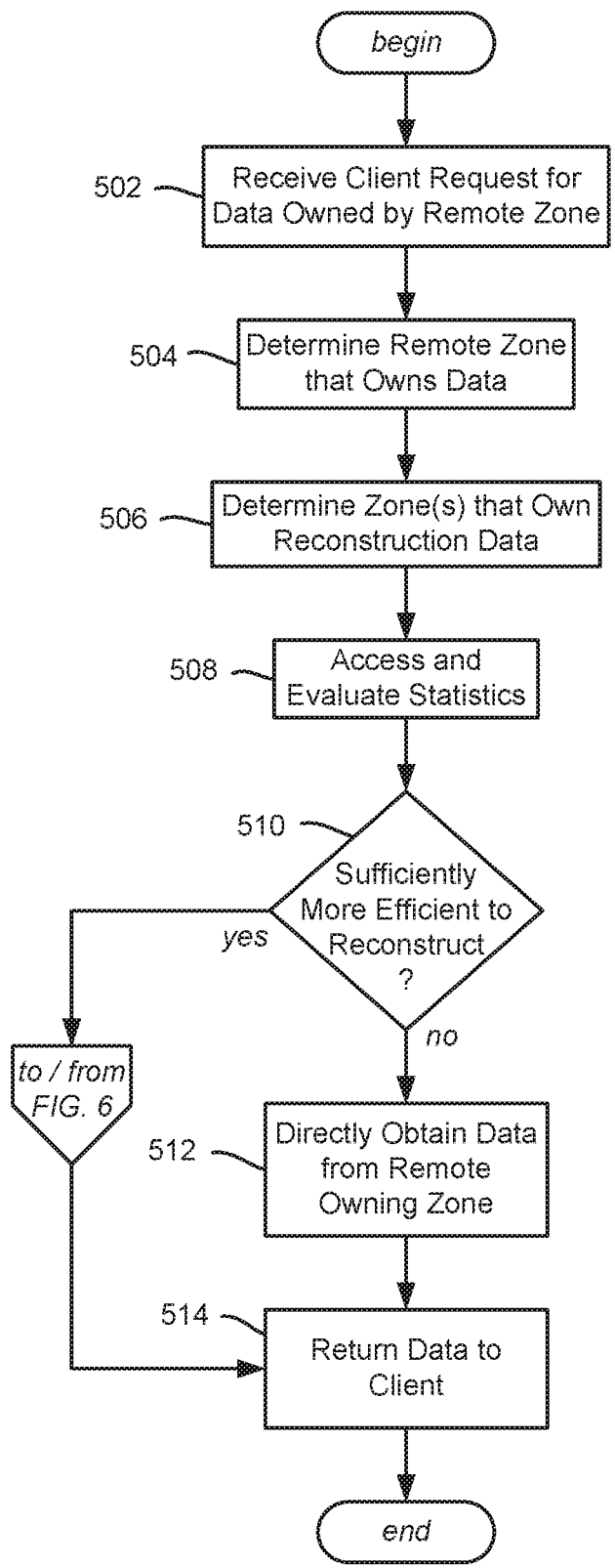
FIG. 5 and FIG. 6 comprises an example flow diagram showing example operations related to obtaining requested data, including data from a zone that contains data by which the requested data can be reconstructed, in accordance with various aspects and implementations of the subject disclosure.

FIG. 5 shows example operations related to the possible rerouting option, beginning at operation 502 where a request for data owned by a remote zone is received from a client requester. Operation 504 represents determining the remote zone that owns the requested data.

As described herein, operation 506 represents determining the zones that own the reconstruction data, that is, the peer reconstruction data portion and the XOR reconstruction data portion. Note that one of the zones may be the zone that received the data request, that is, the local zone may own either the peer data (e.g., as in FIG. 2) or the XOR data (e.g., as in FIG. 3).

Operation 508 represents accessing and evaluating the statistical information, which can also include checking for a blacklisted zone (for purposes of this example, consider that no relevant zone is blacklisted). As set forth herein, the primary owing zone's estimated communication time is evaluated versus the slowest bypass route to either the peer data or the XOR data; if the local zone that received the request owns one of the reconstruction data portions, the time to obtain such a data portion from local storage can be considered almost immediate).

Operation 508 represents determining whether selecting the bypass route plus reconstruction time is sufficiently more efficient than taking the direct route. As set forth herein, "sufficiently more efficient" can involve evaluating an estimated threshold performance improvement as an impediment to simply selecting the faster of the two routes, (as simply selecting the faster route could have an overall adverse impact on the system).

If not deemed sufficiently more efficient to use the reconstruction route at operation 510, then operation 512 directly obtains the requested data from the remote owning zone. Operation 514 returns the requested data to the client.

Figure 6:
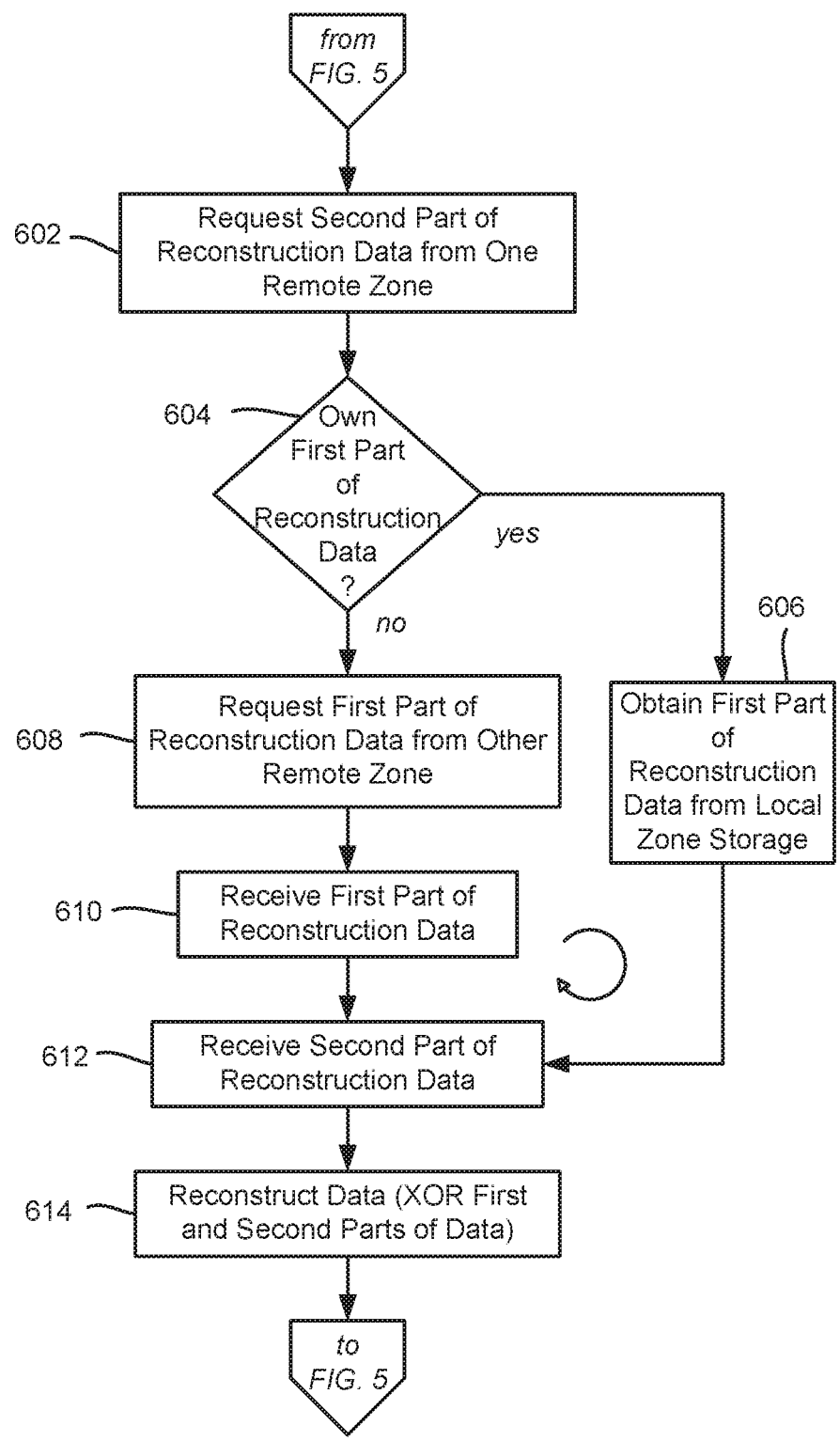

If instead at operation 510 the bypass/reconstruction route is deemed sufficiently more efficient after the statistical evaluation, the process continues to operation 602 of FIG. 6.

Operation 602 represents requesting a (second) part of the reconstruction data, whether peer data or XOR data. Operation 604 represents determining whether the other (first) part of the reconstruction data is locally stored (and thereby obtained via operation 606), or also needs to be obtained via another remote zone, as requested via operation 608 and received via operation 610.

Operation 612 represents receiving the second part of the reconstruction data, (which can occur before operation 610, if operations 608 and 610 are performed). Note that there is some delay when obtaining data from a remote zone. In any event, in this example both the peer and XOR data portions are obtained before operation 614 is performed.

Operation 614 reconstructs the requested data by combining (e.g., bitwise XOR-ing) the two reconstruction parts. Operation 614 then returns to operation 514 of FIG. 5, which returns the requested data to the client.

Figure 7:
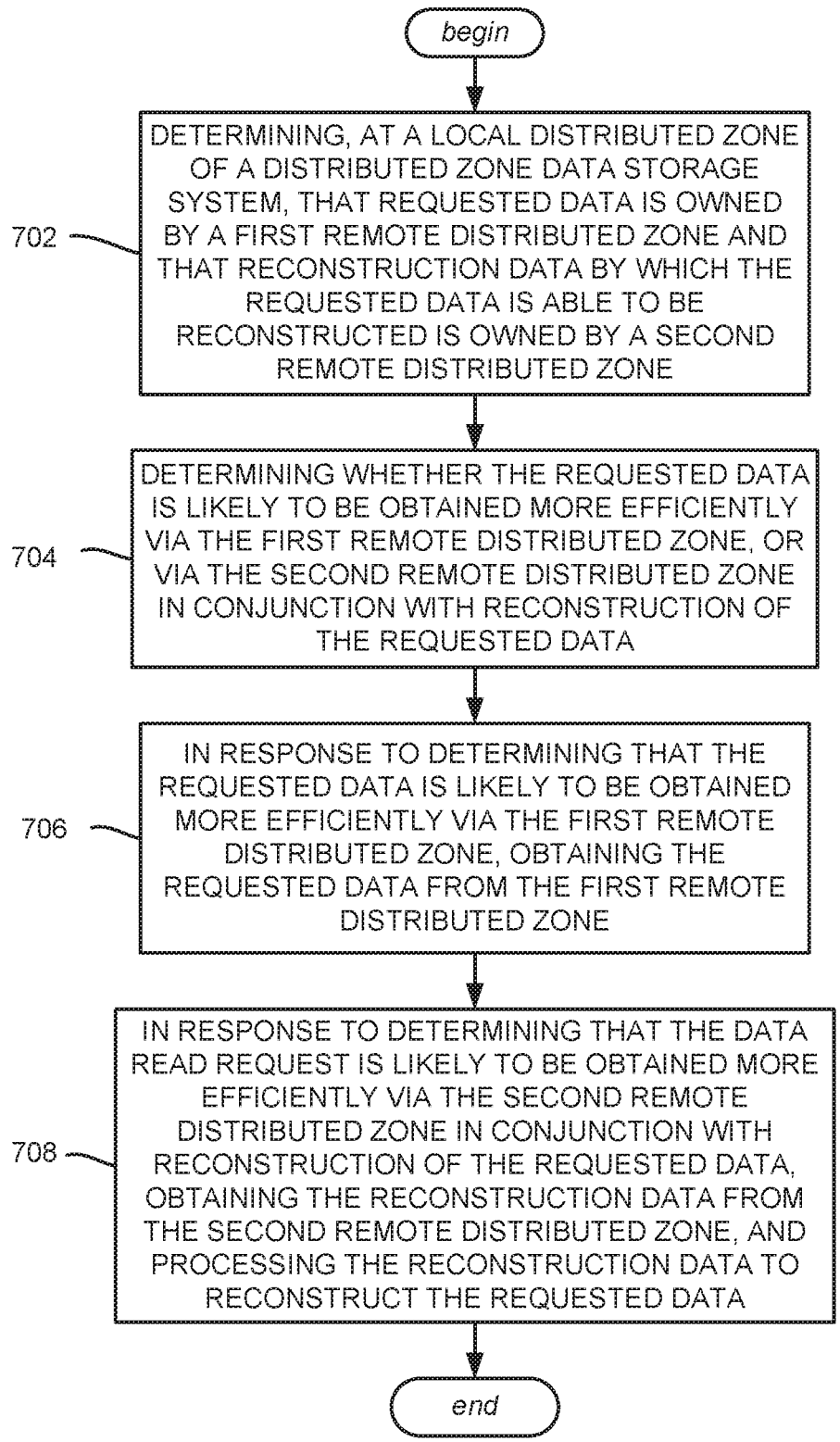
FIG. 7 is a flow diagram showing example operations related to determining whether requested data can be obtained indirectly from a remote zone and reconstructed more efficiently than if directly obtained, and if so, indirectly obtaining and reconstructing the requested data, in accordance with various aspects and implementations of the subject disclosure.

One or more aspects can be embodied in a system, such as represented in FIG. 7, and for example can comprise a memory that stores computer executable components and/or operations, and a processor that executes computer executable components and/or operations stored in the memory. Example operations can comprise operation 702, which represents determining, at a local distributed zone of a distributed zone data storage system, that requested data is owned by a first remote distributed zone and that reconstruction data by which the requested data is able to be reconstructed is owned by a second remote distributed zone. Operation 704 represents determining whether the requested data is likely to be obtained more efficiently via the first remote distributed zone, or via the second remote distributed zone in conjunction with reconstruction of the requested data. Operation 706 represents, in response to determining that the requested data is likely to be obtained more efficiently via the first remote distributed zone, obtaining the requested data from the first remote distributed zone. Operation 708 represents, in response to determining that the data read request is likely to be obtained more efficiently via the second remote distributed zone in conjunction with reconstruction of the requested data, obtaining the reconstruction data from the second remote distributed zone, and processing the reconstruction data to reconstruct the requested data.

Determining whether the requested data is likely to be obtained more efficiently via the first remote distributed zone or via the second remote distributed zone can comprise evaluating whether a likely performance improvement value exceeds a threshold performance improvement value.

Further operations can comprise receiving a client request for the requested data from a client at the local distributed zone of a distributed zone data storage system, and returning the requested data to the client in response to the client request. Receiving the client request for the requested data can comprise receiving a request for a data object corresponding to a segment stored in a data chunk.

The data read request can be determined as being likely to be obtained more efficiently via the second remote distributed zone in conjunction with reconstruction of the requested data; processing the reconstruction data to obtain the requested data can comprise bitwise XOR-ing the reconstruction data with local data maintained at the local distributed zone.

The data read request can be determined as being likely to be obtained more efficiently via the second remote distributed zone in conjunction with reconstruction of the requested data, the reconstruction data can be first reconstruction data, and further operations can comprise obtaining second reconstruction data from a third remote distributed zone; processing the reconstruction data to obtain the requested data can comprise bitwise XOR-ing the first reconstruction data with the second reconstruction data to reconstruct the requested data.

Determining whether the requested data is likely to be obtained more efficiently via the first remote distributed zone or via the second remote distributed zone in conjunction with reconstruction of the requested data can comprise accessing statistics.

Further operations can comprise maintaining the statistics corresponding to a first time value representing an estimated time to read a segment of data from the first remote zone, and a second time value representing an estimated time to read a segment of data from the second remote zone.

Determining whether the requested data is likely to be obtained more efficiently via the first remote distributed zone can comprise determining that the second remote distributed zone has a temporary site outage.

Figure 8:
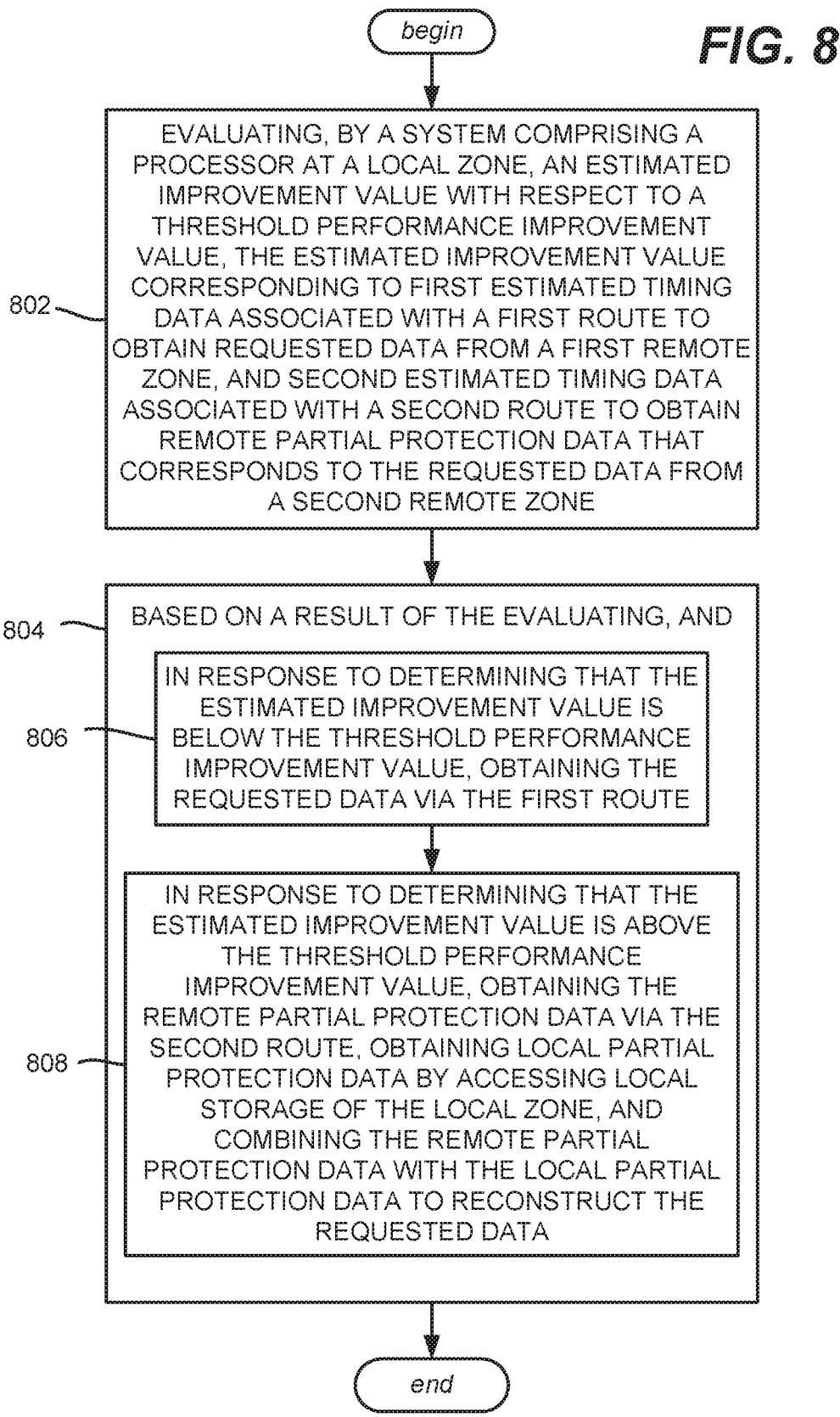
FIG. 8 is an example flow diagram showing example operations related to evaluating a performance improvement to determine whether requested data is to be obtained indirectly from a remote zone and reconstructed or directly obtained, in accordance with various aspects and implementations of the subject disclosure.

One or more example aspects, such as corresponding to example operations of a method, are represented in FIG. 8. Operation 802 represents evaluating, by a system comprising a processor at a local zone, an estimated improvement value with respect to a threshold performance improvement value, the estimated improvement value corresponding to first estimated timing data associated with a first route to obtain requested data from a first remote zone, and second estimated timing data associated with a second route to obtain remote partial protection data that corresponds to the requested data from a second remote zone. Operation 804 represents, based on a result of the evaluating, and in response to determining that the estimated improvement value is below the threshold performance improvement value, obtaining the requested data via the first route (operation 806), and in response to determining that the estimated improvement value is above the threshold performance improvement value, obtaining the remote partial protection data via the second route, obtaining local partial protection data by accessing local storage of the local zone, and combining the remote partial protection data with the local partial protection data to reconstruct the requested data (operation 808).

Aspects can comprise accessing statistical information, and determining the estimated improvement value is based on the statistical information.

Combining the remote partial protection data with the local partial protection data can comprise performing a bitwise XOR-ing of the remote partial protection data with the local partial protection data to reconstruct the requested data.

The requested data can comprise an object, the remote partial protection data can be maintained in a data structure in the second remote zone, and obtaining the remote partial protection data can comprise requesting the remote partial protection data from the second remote zone by providing object offset and object size information associated with the data structure.

Figure 9:
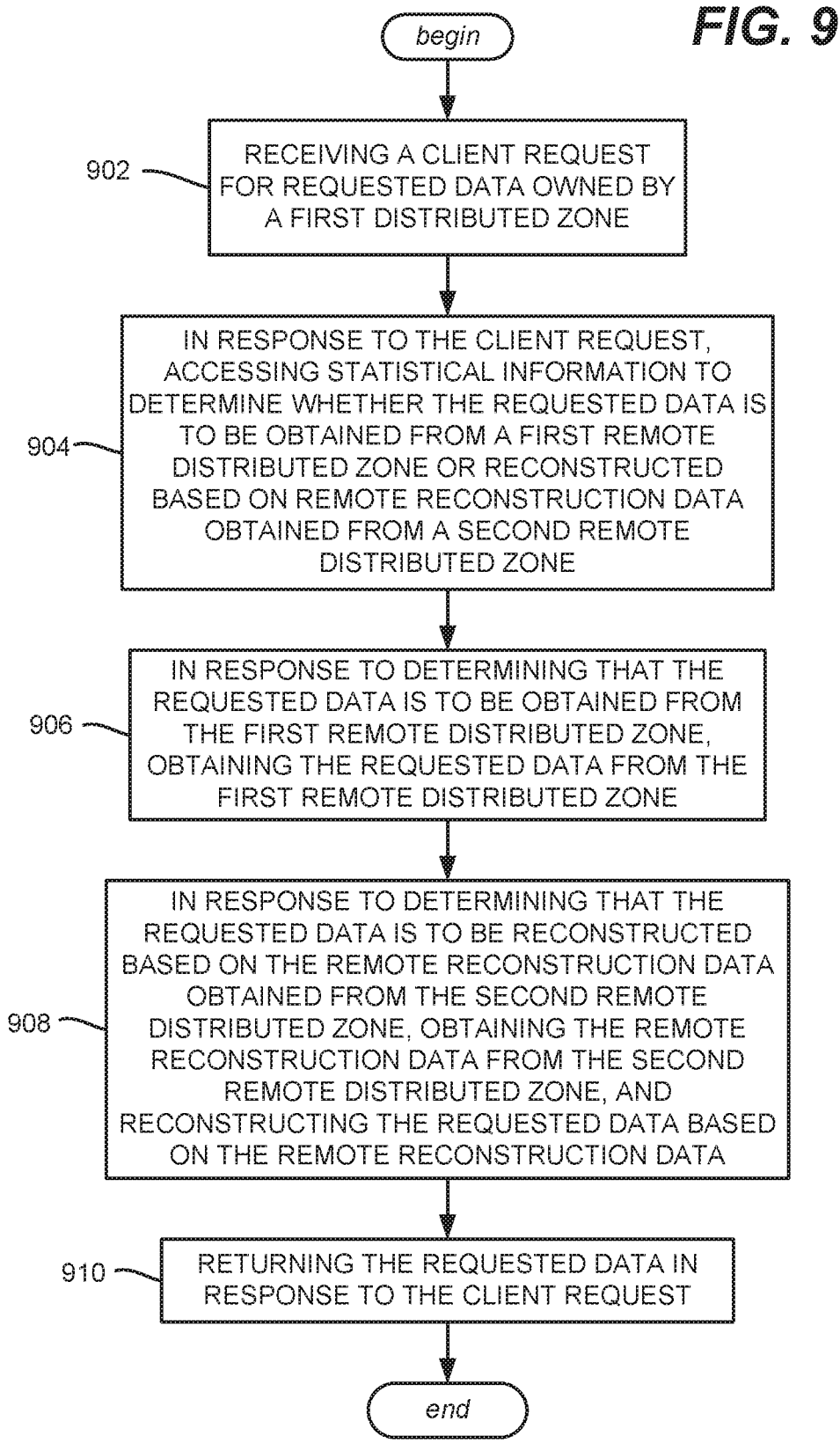
FIG. 9 is an example flow diagram showing example operations related to responding to a client request by obtaining data directly from a remote zone or indirectly by obtaining reconstruction data from another remote zone and reconstructing the requested data, in accordance with various aspects and implementations of the subject disclosure.

FIG. 9 summarizes various example operations, e.g., corresponding to a machine-readable storage medium, comprising executable instructions that, when executed by a processor of a system in a second distributed zone of a data storage system of geographic zones, facilitate performance of operations. Operation 902 represents receiving a client request for requested data owned by a first distributed zone. Operation 904 represents, in response to the client request, accessing statistical information to determine whether the requested data is to be obtained from a first remote distributed zone or reconstructed based on remote reconstruction data obtained from a second remote distributed zone. Operation 906 represents, in response to determining that the requested data is to be obtained from the first remote distributed zone, obtaining the requested data from the first remote distributed zone;

Operation 908 represents, in response to determining that the requested data is to be reconstructed based on the remote reconstruction data obtained from the second remote distributed zone, obtaining the remote reconstruction data from the second remote distributed zone, and reconstructing the requested data based on the remote reconstruction data. Operation 910 represents returning the requested data in response to the client request.

Reconstructing the requested data based on the remote reconstruction data can comprise combining local reconstruction data corresponding to the remote reconstruction data with the remote reconstruction data.

The remote reconstruction data can be first remote reconstruction data, and further operations can comprise obtaining second remote reconstruction data from a third remote distributed zone, and reconstructing the requested data based on the remote reconstruction data can comprise performing a bitwise XOR-ing of the first remote reconstruction data with the second remote reconstruction data to reconstruct the requested data.

Receiving the client request can comprise receiving a request for an object that corresponds to a data segment in a data chunk owned by the first remote distributed zone.

The data chunk can be a first data chunk, obtaining the remote reconstruction data can comprise accessing a remote counterpart data segment maintained in a second data chunk owned by the second distributed zone, and further operations can comprise obtaining local reconstruction data from the local distributed zone, comprising accessing a local counterpart data segment maintained in a local data chunk owned by the local distributed zone.

Further operations can comprise maintaining the statistical information, comprising maintaining timing data corresponding to a first time duration to read data from the first remote zone and a second time duration to read data from the second remote zone. Accessing the statistical information to determine whether the requested data is to be obtained from the first remote distributed zone or reconstructed based on remote reconstruction data obtained from the second remote distributed zone can comprise determining from the statistical information whether a performance improvement threshold is met.

As can be seen, described herein is technology for rerouting to obtain user data based on a state of a geographically replicated data storage system and its components (zones). The technology may be used to increase the data storage system's performance characteristics and to reduce a failure rate for read operations in a geographically replicated data storage system environment. The technology employs navigation principles to determine a direct or indirect remote route to serve data read requests.

Figure 10:
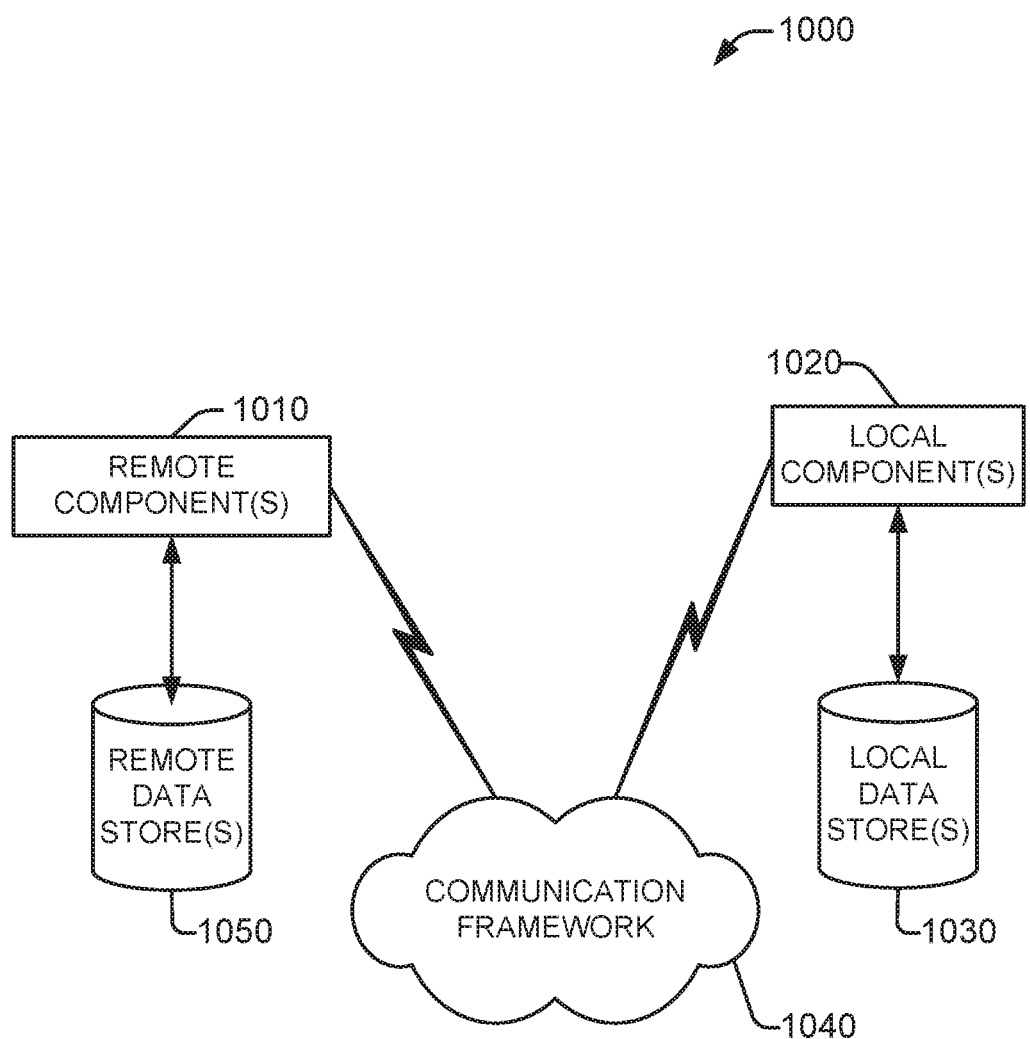
FIG. 10 is a block diagram representing an example computing environment into which aspects of the subject matter described herein may be incorporated.

FIG. 10 is a schematic block diagram of a computing environment 1000 with which the disclosed subject matter can interact. The system 1000 comprises one or more remote component(s) 1010. The remote component(s) 1010 can be hardware and/or software (e.g., threads, processes, computing devices). In some embodiments, remote component(s) 1010 can be a distributed computer system, connected to a local automatic scaling component and/or programs that use the resources of a distributed computer system, via communication framework 1040. Communication framework 1040 can comprise wired network devices, wireless network devices, mobile devices, wearable devices, radio access network devices, gateway devices, femtocell devices, servers, etc.

The system 1000 also comprises one or more local component(s) 1020. The local component(s) 1020 can be hardware and/or software (e.g., threads, processes, computing devices). In some embodiments, local component(s) 1020 can comprise an automatic scaling component and/or programs that communicate/use the remote resources 1010 and 1020, etc., connected to a remotely located distributed computing system via communication framework 1040.

One possible communication between a remote component(s) 1010 and a local component(s) 1020 can be in the form of a data packet adapted to be transmitted between two or more computer processes. Another possible communication between a remote component(s) 1010 and a local component(s) 1020 can be in the form of circuit-switched data adapted to be transmitted between two or more computer processes in radio time slots. The system 1000 comprises a communication framework 1040 that can be employed to facilitate communications between the remote component(s) 1010 and the local component(s) 1020, and can comprise an air interface, e.g., Uu interface of a UMTS network, via a long-term evolution (LTE) network, etc. Remote component(s) 1010 can be operably connected to one or more remote data store(s) 1050, such as a hard drive, solid state drive, SIM card, device memory, etc., that can be employed to store information on the remote component(s) 1010 side of communication framework 1040. Similarly, local component(s) 1020 can be operably connected to one or more local data store(s) 1030, that can be employed to store information on the local component(s) 1020 side of communication framework 1040.

Figure 11:
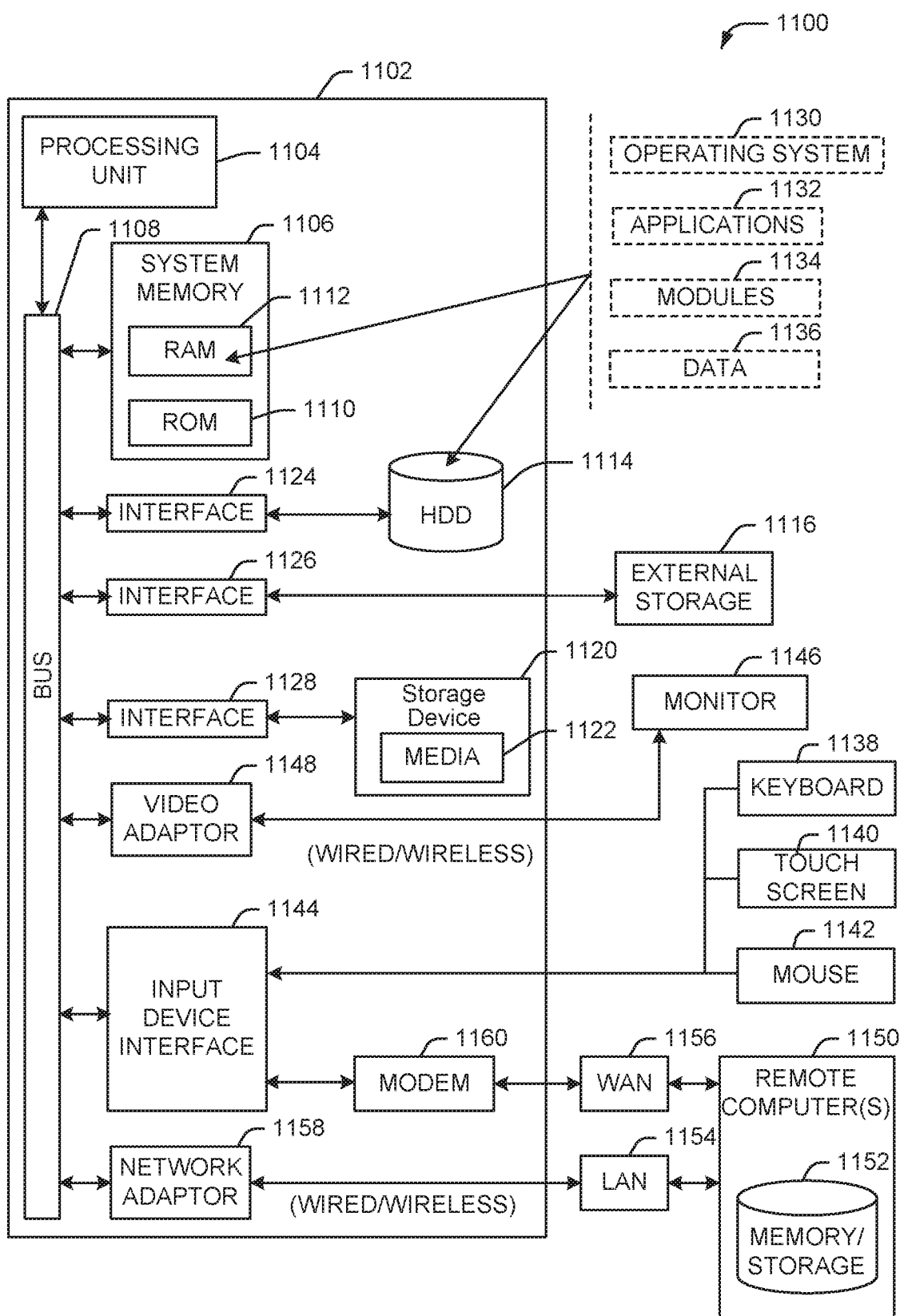
FIG. 11 depicts an example schematic block diagram of a computing environment with which the disclosed subject matter can interact/be implemented at least in part, in accordance with various aspects and implementations of the subject disclosure.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), and can include one or more external storage devices 1116 (e.g., a magnetic floppy disk drive (FDD) 1116, a memory stick or flash drive reader, a memory card reader, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114.

Other internal or external storage can include at least one other storage device 1120 with storage media 1122 (e.g., a solid state storage device, a nonvolatile memory device, and/or an optical disk drive that can read or write from removable media such as a CD-ROM disc, a DVD, a BD, etc.). The external storage 1116 can be facilitated by a network virtual machine. The HDD 1114, external storage device(s) 1116 and storage device (e.g., drive) 1120 can be connected to the system bus 1108 by an HDD interface 1124, an external storage interface 1126 and a drive interface 1128, respectively.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather is to be construed in breadth, spirit and scope in accordance with the appended claims.

What is claimed is:

1. A system, comprising:
a processor; and
a memory that stores executable instructions that, when executed by the processor, facilitate performance of operations, the operations comprising:
determining, at a local distributed zone of a distributed zone data storage system, that requested data is owned by a first remote distributed zone and that reconstruction data by which the requested data is able to be reconstructed is owned by a second remote distributed zone;
determining whether the requested data is likely to be obtained more efficiently via the first remote distributed zone, or via the second remote distributed zone in conjunction with reconstruction of the requested data by evaluating whether a likely performance increase value exceeds a threshold performance increase value; and
in response to determining that the requested data is likely to be obtained more efficiently via the first remote distributed zone, obtaining the requested data from the first remote distributed zone; and
in response to determining that the requested data is likely to be obtained more efficiently via the second remote distributed zone in conjunction with reconstruction of the requested data, obtaining the reconstruction data from the second remote distributed zone, and processing the reconstruction data to reconstruct the requested data.

2. The system of claim 1, wherein the operations further comprise:
receiving a client request for the requested data from a client at the local distributed zone of the distributed zone data storage system, and returning the requested data to the client in response to the client request.

3. The system of claim 2, wherein the receiving the client request for the requested data comprises:
receiving a request for a data object corresponding to a segment stored in a data chunk.

4. The system of claim 1, wherein the requested data is determined as being likely to be obtained more efficiently via the second remote distributed zone in conjunction with reconstruction of the requested data, and wherein the processing the reconstruction data to obtain the requested data comprises:
bitwise XOR-ing the reconstruction data with local data maintained at the local distributed zone.

5. The system of claim 1, wherein the requested data is determined as being likely to be obtained more efficiently via the second remote distributed zone in conjunction with reconstruction of the requested data, wherein the reconstruction data is first reconstruction data, and wherein the operations further comprise:
obtaining second reconstruction data from a third remote distributed zone, and wherein processing the reconstruction data to obtain the requested data comprises bitwise XOR-ing the first reconstruction data with the second reconstruction data to reconstruct the requested data.

6. The system of claim 1, wherein the determining whether the requested data is likely to be obtained more efficiently via the first remote distributed zone or via the second remote distributed zone in conjunction with reconstruction of the requested data comprises:
accessing statistics.

7. The system of claim 6, wherein the operations further comprise:
maintaining the statistics corresponding to a first time value representing an estimated time to read a segment of data from the first remote distributed zone, and a second time value representing an estimated time to read a segment of data from the second remote distributed zone.

8. The system of claim 1, wherein the determining whether the requested data is likely to be obtained more efficiently via the first remote distributed zone comprises:
determining that the second remote distributed zone has a temporary site outage.

9. The system of claim 1, wherein the requested data comprises an object, wherein the reconstruction data is maintained in a data structure in the second remote distributed zone, and wherein the obtaining the reconstruction data comprises:
obtaining the reconstruction data from the second remote distributed zone by providing object offset and object size information associated with the data structure.

10. A method comprising:
evaluating, by a system comprising a processor at a local zone, an estimated improvement value with respect to a threshold performance improvement value, the estimated improvement value corresponding to first estimated timing data associated with a first route to obtain requested data from a first remote zone, and second estimated timing data associated with a second route to obtain remote partial protection data that corresponds to the requested data from a second remote zone;
based on a result of the evaluating, and
in response to determining that the estimated improvement value is below the threshold performance improvement value, obtaining, by the system, the requested data via the first route, and
in response to determining that the estimated improvement value is above the threshold performance improvement value, obtaining, by the system, the remote partial protection data via the second route, obtaining local partial protection data by accessing local storage of the local zone, and combining the remote partial protection data with the local partial protection data to reconstruct the requested data.

11. The method of claim 10, further comprising:
accessing, by the system, statistical information, and wherein the determining the estimated improvement value is based on the statistical information.

12. The method of claim 10, wherein the combining the remote partial protection data with the local partial protection data comprises:
performing, by the system, a bitwise XOR-ing of the remote partial protection data with the local partial protection data to reconstruct the requested data.

13. The method of claim 10, wherein the requested data comprises an object, wherein the remote partial protection data is maintained in a data structure in the second remote zone, and wherein the obtaining the remote partial protection data comprises:
requesting, by the system, the remote partial protection data from the second remote zone by providing object offset and object size information associated with the data structure.

14. A non-transitory machine-readable medium, comprising executable instructions that, when executed by a processor of a system in a local distributed zone of a data storage system of geographic zones, facilitate performance of operations, the operations comprising:
- receiving a client request for requested data owned by a first remote distributed zone;
- in response to the client request, accessing statistical information to determine whether the requested data is to be obtained from the first remote distributed zone or reconstructed based on remote reconstruction data obtained from a second remote distributed zone, based on evaluating whether a likely performance enhancement value exceeds a threshold performance enhancement value;
- in response to determining that the requested data is to be obtained from the first remote distributed zone, obtaining the requested data from the first remote distributed zone;
- in response to determining that the requested data is to be reconstructed based on the remote reconstruction data obtained from the second remote distributed zone, obtaining the remote reconstruction data from the second remote distributed zone, and reconstructing the requested data based on the remote reconstruction data; and
- returning the requested data in response to the client request.

15. The non-transitory machine-readable medium of claim 14, wherein the reconstructing the requested data based on the remote reconstruction data comprises combining local reconstruction data corresponding to the remote reconstruction data with the remote reconstruction data.

16. The non-transitory machine-readable medium of claim 14, wherein the remote reconstruction data is first remote reconstruction data, and wherein the operations further comprise:
- obtaining second remote reconstruction data from a third remote distributed zone, and wherein the reconstructing the requested data based on the remote reconstruction data comprises performing a bitwise XOR-ing of the first remote reconstruction data with the second remote reconstruction data to reconstruct the requested data.

17. The non-transitory machine-readable medium of claim 14, wherein the receiving the client request comprises:
- receiving a request for an object that corresponds to a data segment in a data chunk owned by the first remote distributed zone.

18. The non-transitory machine-readable medium of claim 17, wherein the data chunk is a first data chunk, wherein the obtaining the remote reconstruction data comprises accessing a remote counterpart data segment maintained in a second data chunk owned by the second remote distributed zone, and wherein the operations further comprise:
- obtaining local reconstruction data from the local distributed zone, comprising accessing a local counterpart data segment maintained in a local data chunk owned by the local distributed zone.

19. The non-transitory machine-readable medium of claim 14, wherein the operations further comprise:
- maintaining the statistical information, comprising maintaining timing data corresponding to a first time duration to read data from the first remote distributed zone and a second time duration to read data from the second remote distributed zone.

20. The non-transitory machine-readable medium of claim 14, wherein the accessing the statistical information to determine whether the requested data is to be obtained from the first remote distributed zone or reconstructed based on the remote reconstruction data obtained from the second remote distributed zone comprises:
- determining from the statistical information whether the threshold performance enhancement value is met.

* * * * *